(12) United States Patent
Shapiro

(10) Patent No.: US 10,111,545 B1
(45) Date of Patent: Oct. 30, 2018

(54) SELF-LOCKING FIGURE EIGHT HOOK

(71) Applicant: Barry Shapiro, New York, NY (US)

(72) Inventor: Barry Shapiro, New York, NY (US)

( * ) Notice: Subject to any disclaimer, the term of this patent is extended or adjusted under 35 U.S.C. 154(b) by 0 days.

(21) Appl. No.: 15/785,972

(22) Filed: Oct. 17, 2017

(51) Int. Cl.
*A47G 25/32* (2006.01)
*F16B 45/02* (2006.01)
*F16B 45/06* (2006.01)

(52) U.S. Cl.
CPC ............ *A47G 25/32* (2013.01); *F16B 45/02* (2013.01); *F16B 45/06* (2013.01); *Y10T 24/3485* (2015.01)

(58) Field of Classification Search
CPC ............ Y10T 24/3493; Y10T 24/3485; Y10T 24/45319; Y10T 24/45377; Y10T 24/45293; B66C 1/442; F16B 45/02; F16B 45/06
See application file for complete search history.

(56) References Cited

U.S. PATENT DOCUMENTS 321,554 A * 7/1885 Waterhouse ............ F16G 15/02
59/88
1,708,911 A * 4/1929 Szymanski ............ B60C 27/08
24/376
2,456,374 A 12/1948 Carter
7,841,571 B1 * 11/2010 Ghormley ............ F16L 3/085
24/373

FOREIGN PATENT DOCUMENTS

EP 0 362 087 A1 4/1990

* cited by examiner

*Primary Examiner* — Robert Sandy
(74) *Attorney, Agent, or Firm* — Ohlandt, Greeley, Ruggiero & Perle, L.L.P.

(57) ABSTRACT

A self-locking hook includes an S shaped member having a first surface and a second surface, a first portion for receiving a support member and a second portion for supporting an object; a pivot pin extending through an opening in the S shaped member and extending from the first surface and the second surface; a first locking member held by the pivot pin to pivot against the first surface to defines an opening so that the first portion can engage the support member, to a position where the first locking member and the first portion form a closed loop to surround the support member; and a second locking member held by the pivot pin to pivot against the second surface to define an opening so that the second portion can receive an object to be supported, to a second position where the second locking member and the second portion form a closed loop.

17 Claims, 2 Drawing Sheets

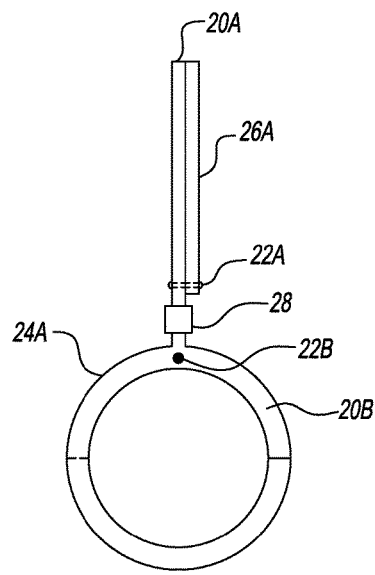
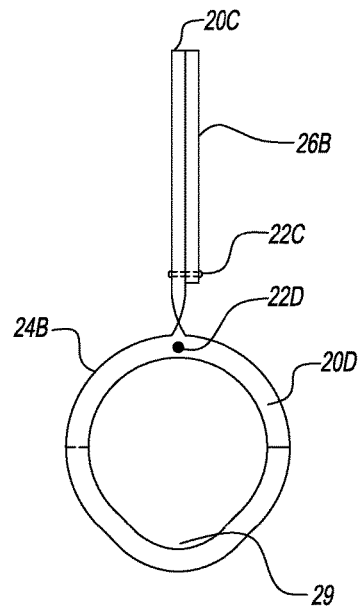
FIG. 4  FIG. 5
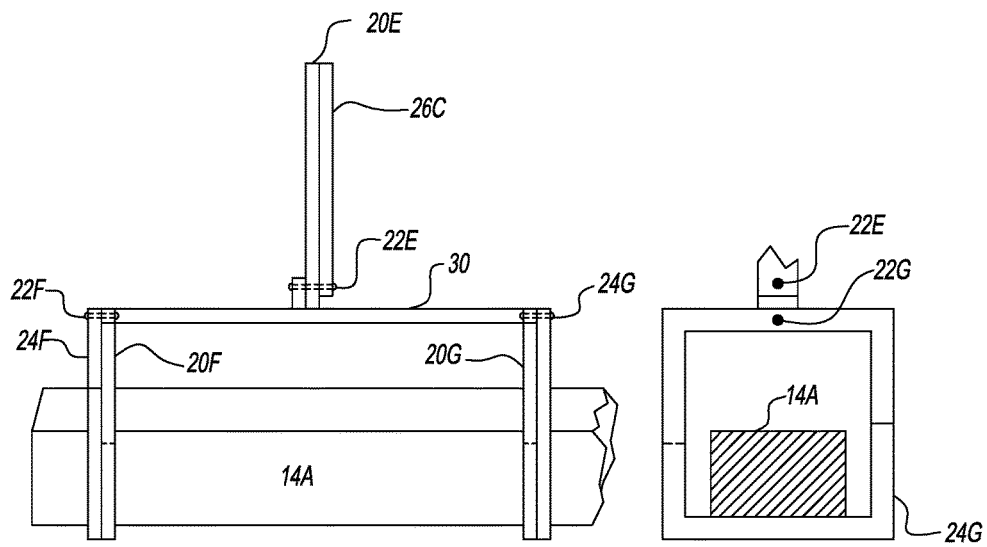
FIG. 6  FIG. 7

SELF-LOCKING FIGURE EIGHT HOOK

BACKGROUND OF THE DISCLOSURE

1. Field of the Disclosure

The present disclosure relates to apparatus for hanging articles. More particularly, it relates to hook type apparatus that can be used to hang an article on a pole or protuberance, and to keep the article securely suspended.

2. Description of the Related Art

Conventional hooks are described in, for example, U.S. Pat. No. 2,456,374 to Carter and European Patent Application 0362087 of Fister et al. Despite their advantages, these devices do not provide a simple structure that is strong and locks securely to prevent the suspended article from falling.

SUMMARY OF THE DISCLOSURE

In general, the various embodiments of the disclosure are directed to a self-locking hook, wherein the weight of an object to be supported by the hook serves to enhance locking, assuring that the object is securely supported. Up to strength limits on the material used in forming the apparatus, the security is improved as weight increases, because of this self-locking action.

The self-locking hook comprising a rigid S shaped member having a first surface and a second surface opposite the first surface, a first portion for receiving a support member and a second portion for supporting an object; a pivot pin extending through an opening in the S shaped member and extending from the first surface and the second surface; a first locking member held by the pivot pin to pivot against the first surface from a position where the first locking member is disposed to define an opening so that the first portion of the S shaped member can be placed upon the support member, to a second position where the first locking member and the first portion form a closed loop to surround the support member; and a second locking member held by the pivot pin to pivot against the second surface from a position where the second locking member is disposed to define an opening so that the second portion of the S shaped member can receive an object to be supported, to a second position where the second locking member and the second portion form a closed loop to support the object.

The S shaped member, the first locking member and the second locking member can be formed of a metal. The metal can be steel.

The S shaped member, the first locking member and the second locking member are of sufficient strength to support the object.

The S shaped member, the first locking member and the second locking member have surfaces which permit the first locking member and the second locking member to slide with respect to the S shaped member when the first locking member and the second locking member are pivoted on the pivot pin.

BRIEF DESCRIPTION OF THE DRAWINGS

FIG. 4 is a side view of another embodiment of the apparatus that has some features that are similar to those of FIGS. 1, 2 and 3.

FIG. 5 is a side view of a further embodiment of the apparatus that has some features that are similar to those of FIGS. 1, 2 and 3.

FIG. 6 is yet a further embodiment disclosed herein.

FIG. 7 is a partial side view of the embodiment of FIG. 6

A component or a feature that is common to more than one drawing is indicated with the same or similar reference number in each of the drawings.

DESCRIPTION OF THE EMBODIMENTS

Figure 1:
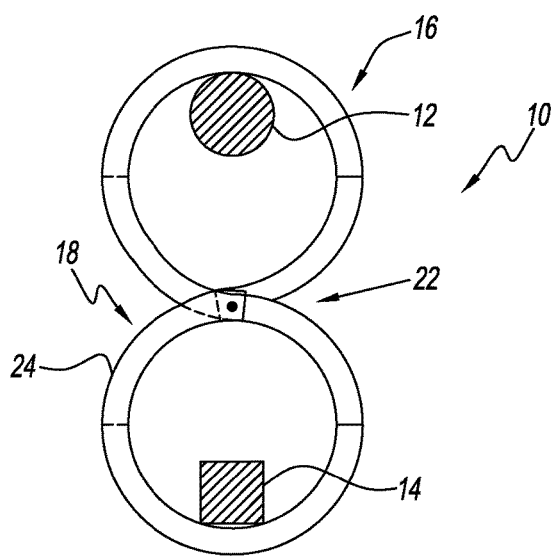
FIG. 1 is a front view of the apparatus disclosed herein.

In FIG. 1 illustrates the apparatus 10 disclosed herein in a locked configuration supported by a support member 12 and the apparatus supporting an object 14. Object 12, shown in cross-section may be a horizontally extending pole or rod or a portion of a hook, or other supporting member that can be received within a first, upper portion 16 of apparatus 10. Object 14 can be any member that needs to be supported or suspended from apparatus 10 below support member 12. It can be a hook, a rod or of any size and shape, as long as it can be received in the opening in the lower portion 18 of apparatus 10.

Figure 2:
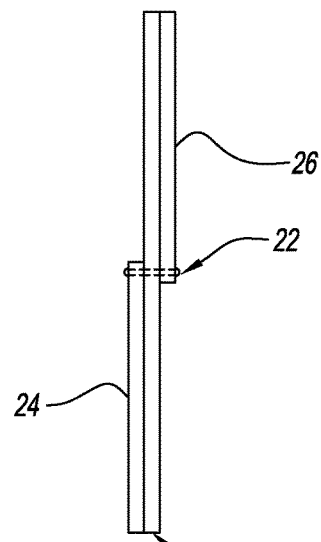
FIG. 2 is a side view of the apparatus of FIG. 1.
Figure 3:
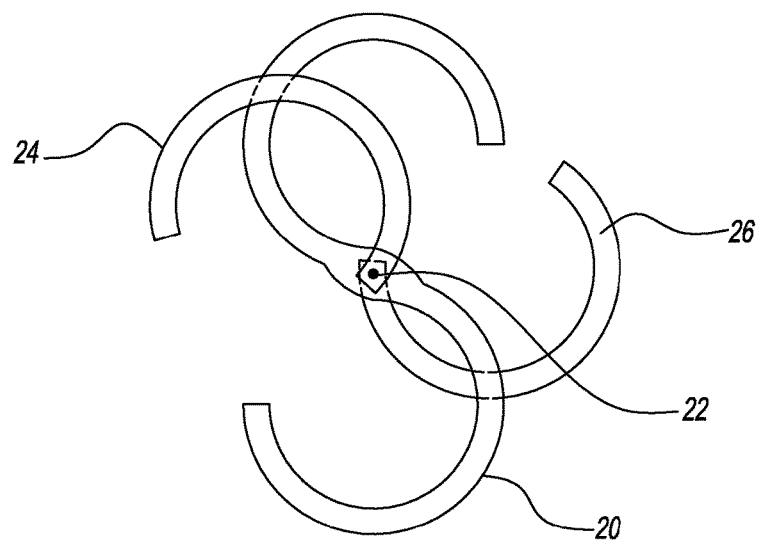
FIG. 3 illustrations the apparatus of FIG. 1 with configured to accept a supporting member and an object to be supported.

Referring to FIG. 1, FIG. 2 and FIG. 3, apparatus 10 includes four components. The first component is a flat, rigid S shaped member 20, having a first surface and a second surface parallel to the first surface. S shaped member 20 may be formed of steel or other suitable material having sufficient thickness and strength to support object 14.

The second component of apparatus 10 is pivot pin 22, which is closely received in a hole centrally located along member 20. Pivot pin 22 can be a rivet or short metal rod that is swaged at its end for purposes described below. Pivot pin 22 serves to pivotally secure the other components of apparatus 10 to member 20. These other components are a first locking member 24 and a second locking member 26. A first end of locking member 24 pivots about pivot pin 22, one end of which is received in a hole in locking member 24. A first end of locking member 26 pivots about pivot pin 22, the other end of which is received in a hole in locking member 26.

As shown in FIG. 3, apparatus 10 can be used by pivoting locking member 26 so that the upper portion of apparatus 10 is not a closed loop, but is open to accept support member 12 between the end of member 10 and locking member 26. Apparatus 10 can be moved so that this occurs. Then, support member 26 can be pivoted at pivot pin 22, generally while lifting apparatus 10, so that a closed upper loop of apparatus 10 is disposed about support member 12, as shown in FIG. 1.

As similar procedure can be used to place object 14 so that it is supported by the lower loop of apparatus 10.

There are cases where one of the loops of apparatus 10 can simply be placed about support member 12 or receive object 14, without pivoting one of the locking members as in the case in FIG. 1 .

Apparatus 10 can assembled by placing pivot pin 22 in the hole in member 20, assembling locking member 24 and locking member 26 on opposite sides of member 20, and then swaging both ends of pivot pin 22 to secure locking member 24 and locking member 26 to member 20. If a rivet is used for pivot pin 22, the components can be assembled by aligning the holes in member 20, with the holes in locking member 24 and locking member 26, placing the rivet, from one side, through all of the holes, and swaging the end of the rivet opposite to the head of the rivet, so that locking member 24, member 20 and locking member 26 are secured together.

Surfaces of the S shaped member, the first locking member and the second locking member should have surfaces which permit the first locking member and the second locking member to easily slide with respect to the S shaped member when the first locking member and the second locking member are pivoted on the pivot pin.

There are many advantages to the structure of apparatus 10. When the weight of and object 14 is being supported, locking member 24 and locking member 26 become even more securely held in place. In other words, the apparatus is self-locking, based on the weight of what is being supported. S shaped member 20 is a source of strength for apparatus 10 and can be configured so as to be able to support a great range of weights, by for example, the proper choice of materials and dimensions, including the thickness of S shaped member 20. Thus, apparatus 10 is a strong structure, and if properly manufactured, capable of supporting a great deal of weight. There are few parts that need to be assembled and the assembly procedure is simple. No specialized tools or machinery, other than what is standard, is needed to manufacture apparatus 10. This is also true of the components of apparatus 10.

Referring to FIG. 4, in the embodiment therein, the upper portion is similar to that of the embodiment of FIGS. 1, 2 and 3. Member 20A functions in a manner similar to that of the upper portion of S shaped member 20 (FIGS. 1, 2 and 3). Member 26A can pivot with respect to member about pivot pin 22A. The loop formed by member 20A and member 26A can be opened by pivoting member 26A so that a supporting structure can be placed within the loop, and then member 26A can be pivoted to close the loop.

Member 20A has, towards the bottom thereof, a swivel member 28. A member 20B, which functions in a manner similar to the lower portion of member 20, is connected to the bottom of swivel member 28. Member 24A and a second member 20B that functions in a manner similar to the lower portion of S shaped member 20 (FIGS. 1, 2 and 3), form a loop. . The loop formed by member 24A and member 26B can be opened by pivoting member 24A so that an object to be supported can be placed within the loop, and then member 24A can be pivoted to close the loop.

FIG. 5 illustrates an embodiment similar to FIG. 4, wherein instead of a swivel member, there is a twist in a connection portion that connects upper portion 20C to lower portion 20D, of what can be an S shaped member similar to S shaped member 20 (FIGS. 1, 2 and 3). The embodiment of FIG. 5 functions in a manner similar to that of FIG. 4, with two pivot pins 22C and 22D, functioning in a manner similar to pivot pins 22A and 22B of FIG. 4. An angle of the plane of the upper loop with respect to the angle of the plane of the lower loop of FIG. 5 is not adjustable as it is in FIG. 4. Instead, in FIG. 5, that angle is fixed by the extent of the twist in the connection portion.

The locking members of the embodiments of FIGS. 1 to 5 may have a portion that defines a receiving region 29 (FIG. 5) that departs from a generally circular configuration and is formed as a "notch" or receiving region for an object to be supported. This may assist in the weight of the object contributing to the self-locking action, as discussed above, wherein the weight of the object further contributes to keeping the locking members in position to securely support an object. The embodiment of FIGS. 6 and 7 may also be configured with such a receiving region.

Referring to FIGS. 6 and 7, another embodiment includes an upper portion formed as a loop similar to that of FIGS. 4 and 5, and two lower portions formed as loops. Specifically, members 20E and 26C function in the same manner as, for example, members 20C and 26B, respectively, with member 26C pivoting about pivot pin 22E to form a loop which can be opened or closed. A connection portion of member 20C includes a boom member 30 integral with or affixed to member 20E. A first end of boom 30 has affixed thereto a first lower loop formed of member 20F and member 22F pivoting with respect to member 20F on pivot pin 22F. A second end of boom 30 has affixed thereto a first lower loop formed of member 20G and member 22G pivoting with respect to member 20G on pivot pin 22G.

The embodiment of FIGS. 6 and 7 is useful for supporting an elongate object, such as, for example, a beam 14A by opening both lower loops to engage the members about the beam, and then closing the loops. In certain cases, it may be advantageous to have a locking mechanism to secure the members that form a loop to one another to assure that the loop remains locked, when a support is engaged by the upper loop, and beam 14A is to be lifted, as discussed below. For example, an additional pin may extend through the bottom of the members forming the loops to secure the members forming the loops to one another so that the loops remain in a closed configuration. However, without such locking mechanism, with a proper size relationship, the locking members can move engage the sides of beam 14A, and thus be firmly locked in place due to the weight of beam 14A.

The various embodiments disclosed herein may be configured with a relatively bulbous lower portion for supporting a relatively large member. The upper portion may be much smaller so as to be fitted to a crane or a hook attached to a crane. Further, although the upper portion and lower portion of apparatus 10 are shown as being in the same general plane in FIGS. 1, 2 and 3, and in generally parallel but displaced planes in the embodiment of FIGS. 7 and 8, the two portions can be in planes which are not parallel to one another, as shown in the embodiments of FIGS. 4 and 5, where they are perpendicular to one another. Alternatively, the upper and lower portions can be in planes which are, for example, at an angle of thirty degrees with respect to one another. The use of an S shaped member with a twist between the upper portion and the lower portion, or a swivel member between the upper portion and the lower portion, as in FIG. 5, allows the angle between the planes to be set at any desired value to accommodate lifting or securing a variety of structures. A swivel member may be used with at least one of the lower loops of the embodiment of FIGS. 6 and 7 to accommodate and allow the support and lifting of object that are not of simple elongate shapes.

The embodiments disclosed herein can be formed in various sizes and used for a variety of different applications. For example, the embodiment of FIGS. 1, 2 and 3 can be used as a key chain, with the lower locking members being small enough to fit through openings at the top of a key. The upper locking members can be sized to fit over a support, such as a peg on a wall or peg board, so that keys on the key chain are supported and displayed for retrieval when needed. The upper locking members can surround a belt loop on trousers, or a belt, so that the key chain can be attached thereto in a removable fashion, for use of a key when needed to operate a lock. The upper and lower loops in such embodiment can be approximately one inch in diameter, although variations in size are clearly possible.

The embodiments described herein can also be of larger size so as to engage and support large structural members such as pipes, beams or items having a hook that can be received in the opening defined by the lower locking members. Depending on the size and the strength of the material from which the apparatus is constructed, large loads of very high weight can be supported. For example, the locking members may form loops of several feet in diameters or larger for cases where heavy objects or loads are to be supported, Regardless of the size (which for the loops defined by the locking members may range, just by way of example, from approximately one inch to five feet or more across), the self-locking feature described above serves to secure the apparatus described to a support member and the object to be supported to the apparatus. Up until material strength limits are reached, and contrary to normal expectations for conventional structures, the security is improved as weight increases, because of this self-locking action.

The apparatus and techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

By S shaped, it is meant generally in the form of an S, but not necessarily rounded. An S shaped member can have squared off portions, as shown, for example, in FIG. 7.

The terms "comprises" or "comprising" are to be interpreted as specifying the presence of the stated features, integers, steps or components, but not precluding the presence of one or more other features, integers, steps or components or groups thereof.

What is claimed is:

1. A self-locking hook, comprising:
   a rigid S shaped member having a first surface and a second surface opposite the first surface, a first portion for receiving a support member and a second portion for supporting an object;
   a pivot pin extending through an opening in the S shaped member and extending from the first surface and the second surface;
   a first locking member held by the pivot pin to pivot against the first surface from a position where the first locking member is disposed to define an opening so that the first portion of the S shaped member can be placed upon the support member, to a second position where the first locking member and the first portion form a closed loop to surround the support member; and
   a second locking member held by the pivot pin to pivot against the second surface from a position where the second locking member is disposed to define an opening so that the second portion of the S shaped member can receive an object to be supported, to a second position where the second locking member and the second portion form a closed loop to support the object.

2. The self-locking hook of claim 1, wherein the S shaped member, the first locking member and the second locking member are formed of a metal.

3. The self-locking hook of claim 2, wherein the metal is steel.

4. The self-locking hook of claim 1, wherein the S shaped member, the first locking member and the second locking member have surfaces which permit the first locking member and the second locking member to slide with respect to the S shaped member when the first locking member and the second locking member are pivoted on the pivot pin.

5. The self-locking hook of claim 1, wherein the first locking member and the second locking member are configured with a similarly shaped recess for receiving an object to be supported.

6. The self-locking hook of claim 5, wherein the S shaped member, the first locking member and the second locking member have surfaces which permit the first locking member and the second locking member to slide with respect to the S shaped member when the first locking member and the second locking member are pivoted on the pivot pin.

7. A self-locking hook for supporting an object, comprising:
   a first portion including a first member and a second member;
   a pivot pin extending through the first member and the second member so that the second member can pivot with respect to the first member from a first configuration in which the first member and the second member form a first closed loop to a second configuration wherein the first loop is not closed;
   a connection portion extending from the first member;
   a second portion connected to the connection portion, the second portion including a third member and a fourth member; and
   a pivot pin extending through the third member and the fourth member so that the fourth member can pivot with respect to the third member from a third configuration in which the third member and the fourth member form a second closed loop to a fourth configuration wherein the second loop is not closed;
   wherein the first loop, when in the second configuration, receives a supporting structure and the first member and the second member lock around the supporting structure when in the first configuration:
   the second loop, when in the fourth configuration, receives an object to be supported and the third member and the fourth member lock around the object when in the third configuration; and
   the first member, the second member, the third member and the fourth member are configured so that weight of the object causes the first member and the second member to securely lock together, and the third member and the fourth member to securely lock together, wherein:
   the connecting member includes a swivel structure so that the fist loop and the second loop can be rotated to be in planes that are not parallel.

8. The self-locking hook of claim 7, wherein the first loop and the second loop are circular loops.

9. The self-locking hook of claim 7, wherein the second loop and the third loop are rectangular loops.

10. The self-locking hook of claim 7, wherein the first loop is a circular loop.

11. A self-locking hook for supporting an object, comprising:
    a first portion including a first member and a second member;
    a pivot pin extending through the first member and the second member so that the second member can pivot with respect to the first member from a first configuration in which the first member and the second member form a first closed loop to a second configuration wherein the first loop is not closed;
    a connection portion extending from the first member;
    a second portion connected to the connection portion, the second portion including a third member and a fourth member; and a pivot pin extending through the third member and the fourth member so that the fourth member can pivot with respect to the third member from a third configuration in which the third member and the fourth member form a second closed loop to a fourth configuration wherein the second loop is not closed;

wherein the first loop, when in the second configuration, receives a supporting structure and the first member and the second member lock around the supporting structure when in the first configuration:

the second loop, when in the fourth configuration, receives an object to be supported and the third member and the fourth member lock around the object when in the third configuration; and the first member, the second member, the third member and the fourth member are configured so that weight of the object causes the first member and the second member to securely lock together, and the third member and the fourth member to securely lock together, wherein the connecting member includes a twisted structure so that the fist loop and the second loop are in planes that are not parallel.

12. The self-locking hook of claim 11 wherein the first loop and the second loop are circular loops.

13. A self-locking hook for supporting an object, comprising:

a first portion including a first member and a second member;

a pivot pin extending through the first member and the second member so that the second member can pivot with respect to the first member from a first configuration in which the first member and the second member form a first closed loop to a second configuration wherein the first loop is not closed;

a connection portion extending from the first member;

a second portion connected to the connection portion, the second portion including a third member and a fourth member; and a pivot pin extending through the third member and the fourth member so that the fourth member can pivot with respect to the third member from a third configuration in which the third member and the fourth member form a second closed loop to a fourth configuration wherein the second loop is not closed;

wherein the first loop, when in the second configuration, receives a supporting structure and the first member and the second member lock around the supporting structure when in the first configuration:

the second loop, when in the fourth configuration, receives an object to be supported and the third member and the fourth member lock around the object when in the third configuration; and the first member, the second member, the third member and the fourth member are configured so that weight of the object causes the first member and the second member to securely lock together, and the third member and the fourth member to securely lock together, wherein the connecting portion includes a boom member and the second loop is disposed at a first end of the boom member, and a third loop at a second end of the boom member, the third loop being of the same structure as the second loop.

14. The self-locking hook of claim 13, wherein the second loop is disposed in a first plane and the third loop is disposed in a second pane, wherein the first plane and the second plane are parallel to one another.

15. The self-locking hook of claim 14, wherein the first loop is disposed at a position at the center of the boom member.

16. The self-locking hook of claim 14, wherein the object to be supported is an elongate member of rectangular cross-section.

17. A self-locking hook for supporting an object, comprising:

a first portion including a first member and a second member;

a pivot pin extending through the first member and the second member so that the second member can pivot with respect to the first member from a first configuration in which the first member and the second member form a first closed loop to a second configuration wherein the first loop is not closed;

a connection portion extending from the first member;

a second portion connected to the connection portion, the second portion including a third member and a fourth member; and a pivot pin extending through the third member and the fourth member so that the fourth member can pivot with respect to the third member from a third configuration in which the third member and the fourth member form a second closed loop to a fourth configuration wherein the second loop is not closed;

wherein the first loop, when in the second configuration, receives a supporting structure and the first member and the second member lock around the supporting structure when in the first configuration:

the second loop, when in the fourth configuration, receives an object to be supported and the third member and the fourth member lock around the object when in the third configuration; and the first member, the second member, the third member and the fourth member are configured so that weight of the object causes the first member and the second member to securely lock together, and the third member and the fourth member to securely lock together a first locking mechanism for securing the first member to the second member; and a second locking mechanism for securing the third member to the fourth member.

* * * * *